United States Patent
Ye et al.

(10) Patent No.: US 11,296,384 B2
(45) Date of Patent: Apr. 5, 2022

(54) BATTERY MOUNTING APPARATUS, BATTERY AND UNMANNED AERIAL VEHICLE

(71) Applicant: SZ DJI TECHNOLOGY CO., LTD., Shenzhen (CN)

(72) Inventors: Fangming Ye, Shenzhen (CN); Tao Peng, Shenzhen (CN); Liang Sun, Shenzhen (CN); Di Ou, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 95 days.

(21) Appl. No.: 16/393,494

(22) Filed: Apr. 24, 2019

(65) Prior Publication Data
US 2019/0252654 A1 Aug. 15, 2019

Related U.S. Application Data

(63) Continuation of application No. PCT/CN2016/103655, filed on Oct. 27, 2016.

(51) Int. Cl.
| | | |
|---|---|---|
| *H01M 50/209* | (2021.01) | |
| *B64D 27/24* | (2006.01) | |
| *H01M 50/20* | (2021.01) | |

(52) U.S. Cl.
CPC ......... *H01M 50/209* (2021.01); *B64D 27/24* (2013.01); *H01M 50/20* (2021.01); *B64C 2201/027* (2013.01); *B64C 2201/042* (2013.01); *H01M 2220/20* (2013.01)

(58) Field of Classification Search
CPC ............ H01M 2/10–1072; H01M 2220/30
See application file for complete search history.

(56) References Cited

U.S. PATENT DOCUMENTS

| | | | | |
|---|---|---|---|---|
| 2002/0086647 A1* | 7/2002 | Ilvonen | ............... | H04M 1/0262 455/90.3 |
| 2009/0023059 A1* | 1/2009 | Kinoshita | ........... | H01M 2/1072 429/153 |
| 2010/0086840 A1* | 4/2010 | Shao | ................... | H01M 2/1066 429/97 |
| 2010/0136397 A1* | 6/2010 | Lu | ...................... | H01M 50/209 429/100 |

(Continued)

FOREIGN PATENT DOCUMENTS

| | | | |
|---|---|---|---|
| CN | 2468086 Y | * | 12/2001 |
| CN | 2468086 Y | | 12/2001 |
| CN | 201145867 Y | | 11/2008 |

(Continued)

OTHER PUBLICATIONS

CN10152314A English machine translation (Year: 2020).*

(Continued)

*Primary Examiner* — Ula C Ruddock
*Assistant Examiner* — Armindo Carvalho, Jr.
(74) *Attorney, Agent, or Firm* — Anova Law Group, PLLC

(57) ABSTRACT

A battery mounting apparatus includes a mounting plate configured to hold a battery, a locking structure configured to detachably attach the battery to the mounting plate, and an ejection structure configured to eject the battery when the locking structure releases the battery, such that at least a portion of the battery is separated from the mounting plate.

20 Claims, 9 Drawing Sheets

(56) References Cited

U.S. PATENT DOCUMENTS

2012/0110810 A1* 5/2012 Houser .............. A61B 17/2812
29/271

FOREIGN PATENT DOCUMENTS

| | | | |
|---|---|---|---|
| CN | 101452314 A | 6/2009 | |
| CN | 101645493 A | 2/2010 | |
| CN | 101752519 A | 6/2010 | |
| CN | 102890387 A | 1/2013 | |
| CN | 103117368 A | 5/2013 | |
| CN | 204118794 U | 1/2015 | |
| CN | 204223172 U | 3/2015 | |
| CN | 105939933 A * | 9/2016 | .............. H01M 2/20 |
| CN | 206148498 U | 5/2017 | |
| JP | H04328937 A | 11/1992 | |

OTHER PUBLICATIONS

CN105939933A English machine translation (Year: 2020).*
CN-2468086-Y English machine translation (Year: 2021).*
World Intellectual Property Organization (WIPO) International Search Report for PCT/CN2016/103655 dated Aug. 2, 2017 7 Pages.

* cited by examiner

BATTERY MOUNTING APPARATUS, BATTERY AND UNMANNED AERIAL VEHICLE

CROSS-REFERENCE TO RELATED APPLICATION

This application is a continuation of International Application No. PCT/CN2016/103655, filed on Oct. 27, 2016, the entire contents of which are incorporated herein by reference.

TECHNICAL FIELD

The present disclosure relates to battery mounting apparatus and battery and, more particularly, to a battery mounting apparatus and a battery for unmanned aerial vehicles.

BACKGROUND

The existing battery mounting apparatus, especially the type of battery mounting apparatus for unmanned aerial vehicles, often mounts detachable batteries on the housing of unmanned aerial vehicle using elastic clamps. However, it is difficult to release the elastic clamps. In addition, unmanned aerial vehicles capable of long flight time may be equipped with substantially large and heavy batteries, making it more difficult to mount and unmount the batteries.

SUMMARY

In accordance with the disclosure, there is provided a battery mounting apparatus including a mounting plate configured to hold a battery, a locking structure configured to detachably attach the battery to the mounting plate, and an ejection structure configured to eject the battery when the locking structure releases the battery, such that at least a portion of the battery is separated from the mounting plate.

DESCRIPTION OF MAIN REFERENCE NUMERALS

| | |
|---|---|
| Battery mounting apparatus | 100, 513 |
| First battery | 300 |
| Second battery | 400 |
| First mounting plate | 110 |
| Second mounting plate | 120 |
| First side plate | 130 |
| Flexible cantilever | 132 |
| Second side plate | 140 |
| First ejection structure | 150 |
| First locking structure | 160 |
| First ejection guide structure | 170 |
| First locking guide structure | 180 |
| Second ejection guide structure | 270 |
| Second locking guide structure | 280 |
| Second ejection structure | 250 |
| Second locking structure | 260 |
| First sliding structure | 111 |
| Second sliding structure | 301 |
| Rib | 301a |
| Third sliding structure | 131 |
| Fourth sliding structure | 302 |
| End portion | 133, 302b |
| Main body | 302a |
| Notch | 305 |
| Ridge | 306 |
| Ejection structure opening | 112 |
| Locking structure opening | 118 |
| First portion | 118a |
| Second portion | 118b |
| Mounting post | 114, 116a, 157, 166 |
| Abutting member | 116 |
| First ejection part | 151 |
| First elastic part | 152 |
| Sliding slot member | 158 |
| Ejection slider | 154 |
| Fastening member | 159 |
| Protruding stripe | 172, 182 |
| Guide member | 171, 181 |
| Keyhole | 173, 183 |
| Connecting member | 174, 184 |
| Base | 175, 185 |
| First locking part | 161 |
| Second elastic part | 169 |
| Body | 162 |
| Locking slider | 163 |
| Opening | 165 |
| Pressing member | 167 |
| Contacting member | 110a |
| In-position resisting member | 164 |
| Slider member | 163a |
| Force bearing surface | 163b |
| Recess | 163d |
| Extension member | 163c |
| First surface | 303 |
| Side surface | 304 |
| Unmanned aerial vehicle | 500 |
| Vehicle body | 510 |
| Battery receiving chamber | 512 |
| Housing | 511 |

Embodiments of the present disclosure will be described in detail with reference to the accompanying drawings.

DETAILED DESCRIPTION OF THE EMBODIMENTS

Figure 1:
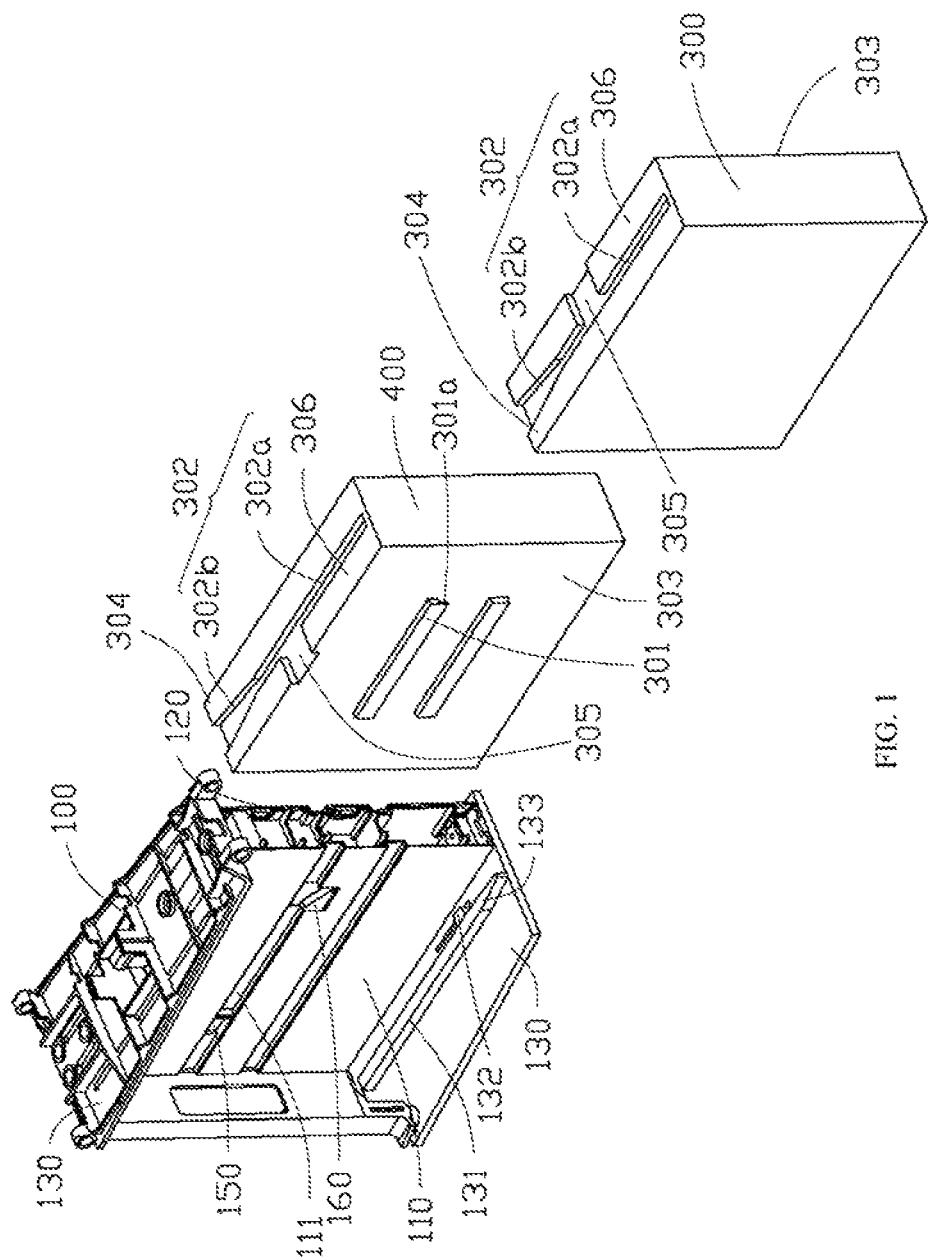
FIG. 1 is an assembly diagram of a battery mounting apparatus according to an example embodiment.

The present disclosure provides a simple and easy-to-detach battery mounting apparatus, especially desired for unmanned aerial vehicle battery mounting. FIG. 1 is an assembly diagram of a battery mounting apparatus according to an example embodiment. As shown in FIG. 1, the battery mounting apparatus 100 facilitates mounting a first battery 300 and a second battery 400.

Figure 2:
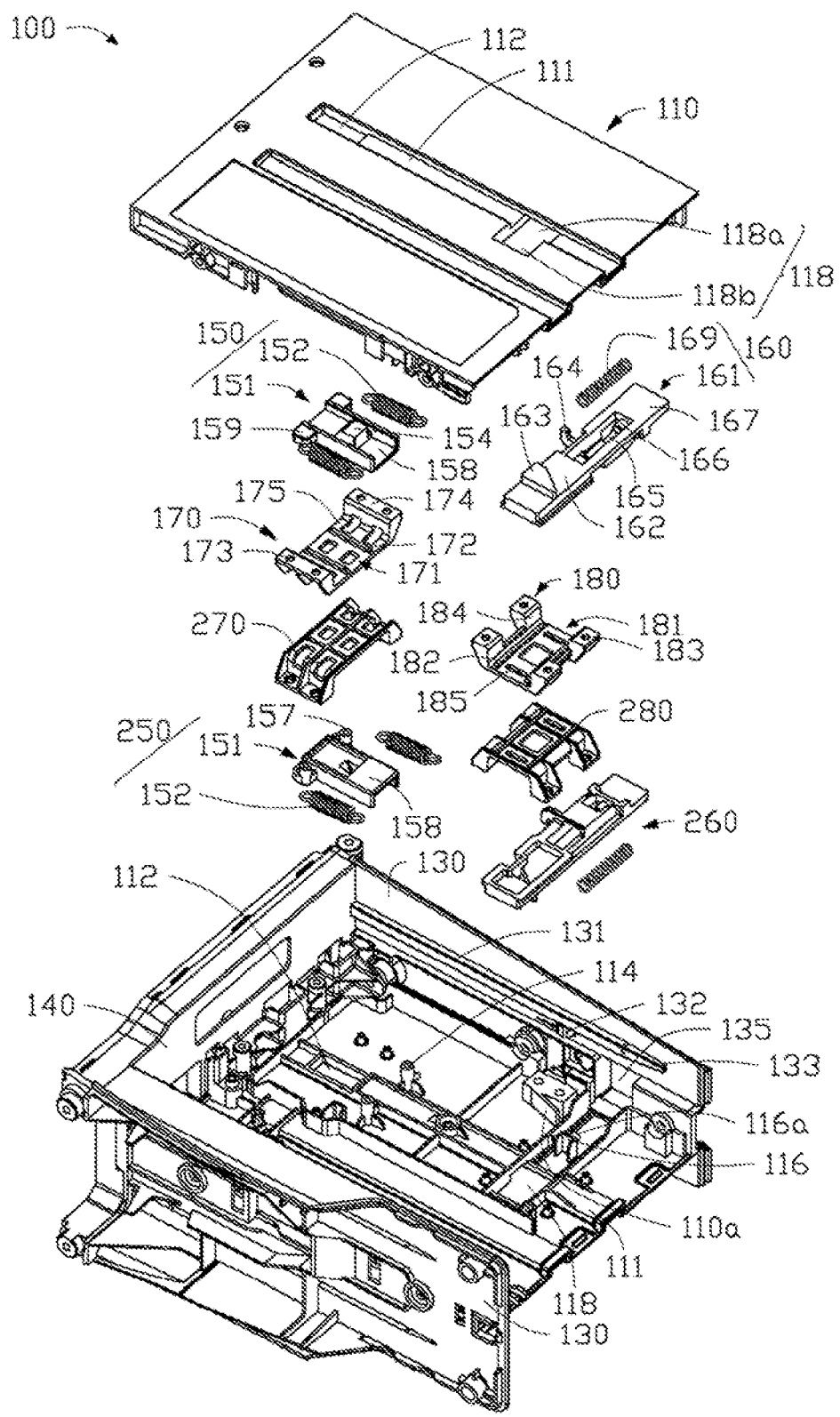
FIG. 2 is an exploded perspective view of the battery mounting apparatus in FIG. 1.
Figure 3:
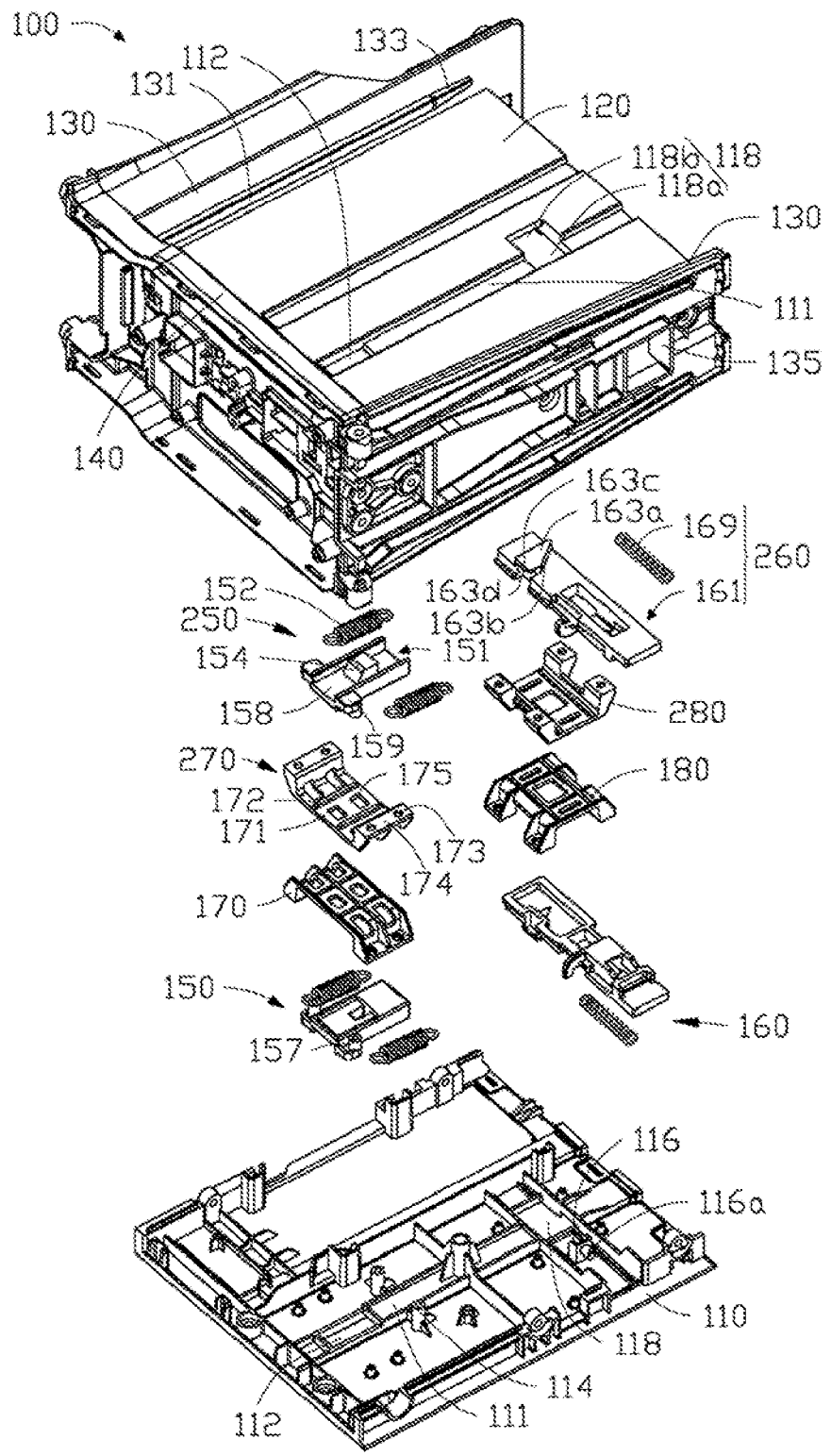
FIG. 3 is an exploded perspective view of the battery mounting apparatus in FIG. 2 from an opposite angle.
Figure 4:
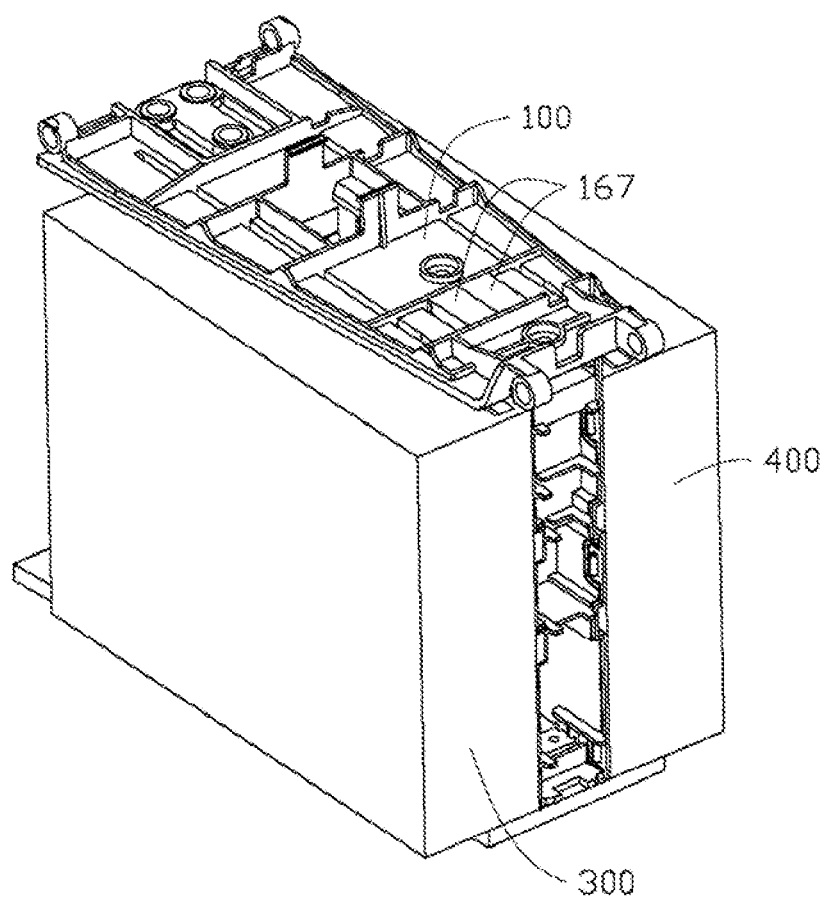
FIG. 4 is a schematic diagram of a battery mounting apparatus with mounted batteries according to an example embodiment.

FIG. 2 is an exploded perspective view of a battery mounting apparatus in FIG. 1. FIG. 3 is an exploded perspective view of a battery mounting apparatus in FIG. 2 from an opposite angle. FIG. 4 is a schematic diagram of a battery mounting apparatus with mounted batteries according to an example embodiment. As shown in FIG. 2, the battery mounting apparatus 100 includes a first mounting plate 110, a second mounting plate 120, a first side plate 130, a second side plate 140, a first ejection structure 150, a first locking structure 160, a first ejection guide structure 170, a first locking guide structure 180, a second ejection structure 250, a second locking structure 260, a second ejection guide structure 270, and a second locking guide structure 280.

The first mounting plate 110 is arranged parallel to and facing toward the second mounting plate 120. Two first side plates 130 are arranged at a first side (no reference numeral) of the first mounting plate 110 and a second side (no reference numeral) of the first mounting plate 110 facing toward the first side of the first mounting plate 110 respectively, and are coupled with and approximately perpendicular to the first mounting plate 110 and the second mounting plate 120. The second side plate 140 is arranged at a third side (no reference numeral) of the first mounting plate 110, adjacent to both the first side and the second side. The second side pate 140 is coupled to the first mounting plate 110, the second mounting plate 120, and the two first side plates 130.

The first ejection structure 150, the first locking structure 160, the first ejection guide structure 170, the first locking guide structure 180, the second ejection guide structure 270, the second locking guide structure 280, the second ejection structure 250, and the second locking structure 260 are disposed between the first mounting plate 110 and the second mounting plate 120.

The first mounting plate 110, the two first side plates 130, and the second side plate 140 together form a receiving chamber to receive the first battery 300. The second mounting plate 120, the two first side plates 130, and the second side plate 140 together form a receiving chamber to receive the second battery 400. As shown in FIG. 1, the first battery 300 and the second battery 400 are arranged at two opposite sides of the battery mounting apparatus 100.

The first mounting plate 110 holds the first battery 300. The first locking structure 160 detachably attaches the first battery 300 to the first mounting plate 110. The first ejection structure 150 pushes out the first battery 300 when the first locking structure 160 releases the first battery 300, such that at least a portion of the first battery 300 is separated from the first mounting plate 110.

The second mounting plate 120 holds the second battery 400. The second locking structure 260 detachably attaches the second battery 400 to the second mounting plate 120. The second ejection structure 250 pushes out the second battery 400 when the second locking structure 260 releases the second battery 400, such that at least a portion of the second battery 400 is separated from the second mounting plate 120.

The first ejection guide structure 170 is disposed on a side of the first ejection structure 150 facing away from the first mounting plate 110 to guide the movement of the first ejection structure 150. The first locking guide structure 180 is disposed on a side of the first locking structure 160 facing away from the first mounting plate 110 to guide the movement of the first locking structure 160. The second ejection guide 270 is disposed on a side of the second ejection structure 250 facing away from the second mounting plate 120 to guide the movement of the second ejection structure 250. The second locking guide structure 280 is disposed on a side of the second locking structure 260 facing away from the second mounting plate 120 to guide the movement of the second locking structure 260.

It can be understood that the first mounting plate 110 and the second mounting plate 120 may be defined as a bottom plate assembly of the battery mounting apparatus 100. The first battery 300 and the second battery 400 may be mounted on the two opposite surfaces of the bottom plate assembly (e.g., the surface of the first mounting plate 110 facing away from the second mounting plate 120 and the surface of the second mounting plate 120 facing away from the first mounting plate 110). In some embodiments, the first battery 300 may be mounted on the first mounting plate 110 and the second battery 400 may be mounted on the second mounting plate 120. The first locking structure 160 and the second locking structure 260 may detachably attach the first battery 300 to the first mounting plate 110 and the second battery 400 to the second mounting plate 120, respectively. The first ejection structure 150 and the second ejection structure 250 may be defined as an ejecting assembly of the battery mounting apparatus 100. When the first battery 300 and the second battery 400 are released, the first battery 300 and the second battery 400 may be pushed out by the ejecting assembly, such that at least a portion of the first battery 300 and at least a portion of the second battery 400 are separated from their corresponding mounting plates.

In some embodiments, the first battery 300 and the second battery 400 may be identical and arranged symmetrically. The first mounting plate 110 and the second mounting plate 120 may be identical and arranged symmetrically. The first ejection structure 150 and the second ejection structure 250 may be identical and arranged symmetrically. The first locking structure 160 and the second locking structure 260 may be identical and arranged symmetrically. The first ejection guide structure 170 and the second ejection guide structure 270 may be identical and arranged symmetrically. The first locking guide structure 180 and the second locking guide structure 280 may be identical and arranged symmetrically. The mounting details and the relationship between the first mounting plate 110, the first ejection structure 150, the first locking structure 160, the first ejection guide structure 170, the first locking guide structure 180, and the first battery 300 may be described below.

In some embodiments, a first sliding structure 111 may be arranged at a surface of the first mounting plate 110 adjacent to the first battery 300. In some embodiments, two first sliding structures 111 may be arranged at the surface of the first mounting plate 110 as first sliding slots. The two sliding slots may have a recessed straight bar shape and may be arranged in parallel. The two first sliding structures 111 may be arranged parallel to the two first side plates 130 and perpendicular to the second side plate 140. The two first sliding structures 111 may extend from the third side of the first mounting plate 110 to a fourth side of the first mounting plate 110 opposite to the third side.

The first battery 300 may include a first surface 303 and a second sliding structure 301 arranged at the first surface 303 and coupled with the first sliding structure 111. In some embodiments, two second sliding structures 301 may be arranged in parallel and in the center position of the first surface 303. The two second sliding structures 301 may have a protruding bar shape. The two protruding bars of the first battery 300 may slide in the two first sliding slots arranged at the first mounting plate 110, such that the first battery 300 may slide into or out of the battery mounting apparatus 100. In some embodiments, the first sliding structures 111 on the first mounting plate 110 may be protruding bars and the second sliding structures 301 on the first battery 300 may be sliding slots coupled with the protruding bars on the first mounting plate 110.

In addition, when the first battery 300 is released by the first locking structure 160, the first ejection structure 150 may push out the first battery 300, such that at least a portion of the second sliding structures 301 on the first battery 300 may be separated from the first sliding structures 111 on the first mounting plate 110 and at least a portion of the first battery 300 may be slid out of the battery mounting apparatus 100.

Further, a third sliding structure 131 may be arranged at the first side plate 130. The first battery 300 may include a fourth sliding structure 302 corresponding to the third sliding structure 131. The fourth sliding structure 302 on the first battery 300 and the third sliding structure 131 on the first side plate 130 may be coupled with each other for sliding movement. When the first battery 300 is released by the first locking structure 160, the first ejection structure 150 may push out the first battery 300, such that at least a portion of the fourth sliding structure 302 on the first battery 300 may be separated from the third sliding structure 131 on the first side plate 130 and at least a portion of the first battery 300 may be slid out of the battery mounting apparatus 100.

The first side plate 130 may further include a flexible cantilever 132. The flexible cantilever 132 may be flexibly coupled to the first side plate 130.

The first battery 300 may further include a side surface 304 connected to the first surface 303. The fourth sliding structure 302 may be arranged at the side surface 304. A notch 305 may be arranged at the side surface 304 and a ridge 306 may be disposed on both sides of the notch 305 on the side surface 304. The notch 305 may accommodate the flexible cantilever 132. When the first battery 300 is attached to the first mounting plate 110, the flexible cantilever 132 may be located in the notch 305. When the first battery 300 is released and pushed out from the first mounting plate 110, the flexible cantilever 132 may contact at least a portion of the ridge 306 on a side of the notch 305.

In some embodiments, the third sliding structure 131 may be a protruding bar and the fourth sliding structure 302 may be a sliding slot. The sliding slot of the fourth sliding structure 302 may be in communication with the notch 305. The third sliding structure 131 may include an end portion 133 located on a side distal from the second side plate 140. The end portion 133 of the third sliding structure 131 may gradually decrease in width in a direction facing away from the second side plate 140. The sliding slot of the fourth sliding structure 302 may include a main body 302a and an end portion 302b disposed on a side of the main body 302a facing toward the second side plate 140. The end portion 302b may increase in width in a direction facing away from the main body 302a.

The first mounting plate 110 may further include an ejection structure opening 112 and a locking structure opening 118 (referring to FIG. 3). The ejection structure opening 112 may be arranged near the first ejection structure 150 corresponding to the first sliding slot to expose at least a portion of the first ejection structure 150. The locking structure opening 118 may be arranged near the first locking structure 160 of the first mounting plate 110 to expose at least a portion of the first locking structure 160. The locking structure opening 118 may include a first portion 118a of the first slide slot and a second portion 118b in communication with the first portion 118a.

Mounting posts 114 and abutting members 116, both extending perpendicularly from the plate body, may be arranged at a surface of the first mounting plate 110 facing away from the first battery 300. The mounting posts 114 may be arranged corresponding to the first ejection structure 150. Two mounting posts 114 may be arranged at both sides of the back of the first sliding structure 111, respectively. The abutting members 116 may be arranged corresponding to the first locking structure 160. Only one abutting member 116 may be arranged. The abutting member 116 may have an approximately square shape. A mounting post 116a may be arranged at the center of the abutting member 116. The mounting post 116a may protrude perpendicularly from the surface of the abutting member 116 and may extend in a direction parallel to the plate body of the first mounting plate 110.

The first ejection structure 150 may be arranged at a side of the first mounting plate 110 facing away from the first battery 300, and may include a first ejection part 151 and a first elastic part 152. The first ejection part 151 may include a sliding slot member 158, an ejection slider 154 arranged at the sliding slot member 158, and two fastening members 159 arranged at both sides of the sliding slot member 158, respectively. A fastening post 157 may be arranged at the fastening member 159. The fastening posts 157 and the ejection slider 154 may be arranged at two opposite sides of the first ejection part 151.

The sliding slot member 158 may be arranged corresponding to the ejection structure opening 112. The sliding slot member 158 may have an n-shape cross-section and may partially accommodate the first sliding structure 111. The ejection slider 154 may be exposed from the first sliding structure 111 of the first mounting plate 110 through the ejection structure opening 112. The ejection slider 154 may have a trapezoidal cross-section, but may not be limited to the trapezoidal cross-section.

The first elastic part 152 may be arranged between the first mounting plate 110 and the first ejection part 151 to drive the first ejection part 151 to push out the first battery 300. In some embodiments, the first elastic part 152 may include two spring coils. One end of each spring coil may be fastened to the fastening post 157 of the first ejection part 151 and the other end of each spring coil may be fastened to a mounting post 114 of the first mounting plate 110. In some embodiments, the spring coils of the first elastic part 152 may include tension spring coils.

The first ejection guide structure 170 may be arranged at a side of the first ejecting elastic part 152 facing away from the first ejection part 151. The first ejection guide structure 170 may include a base 175. A guide member 171 may be arranged at the base 175 corresponding to the sliding slot member 158 of the first ejection part 151. The guide member 171 may guide the movement of the sliding slot member 158 of the first ejection part 151. In some embodiments, two protruding stripes 172 may be arranged at a side of the first ejection guide structure 170 adjacent to the first ejection part 151. The two protruding stripes 172 may be arranged parallel to each other to define the guide member 171. The sliding slot member 158 of the first ejection part 151 may slide in the guide member 171 defined by the two protruding stripes 172.

Further, the first ejection guide structure 170 may include a connecting member 174 on both sides of the base 175. The two connecting members 174 may be arranged opposite to each other and may connect approximately perpendicularly to the base 175. At least a portion of the first ejection part 151 may be accommodated in a space enclosed between the two connecting members 174 and the base 175. The connecting members 174 may be connected and fastened to the first mounting plate 110. In some embodiments, keyholes 173 may be arranged at the connecting member 174. The connecting members 174 may be fastened to the first mounting plate 110 by screws.

The first locking structure 160 may include a first locking part 161 and a second elastic part 169. At least a portion of the first locking part 161 may be exposed from the locking structure opening 118 of the first mounting plate 110 to contact the second sliding structure 301 of the first battery 300 to attach the first battery 300 to the first mounting plate 110. The second elastic part 169 may connect between the first locking part 161 and the first mounting plate 110 to drive the first locking part 161 to reset and lock the first battery 300.

In some embodiments, the first locking part 161 may include a body 162, a locking slider 163 arranged at a side of the body 162 adjacent to the first mounting plate 110, an opening 165 penetrating the body 162, a mounting post 166 arranged at the inner side of the opening 165 of the body 162 and extending toward the center of the opening 165, and a pressing member 167 arranged at a side of the body 162 distal from the locking slider 163. The locking slider 163 may be exposed through the locking structure opening 118. The locking slider 163 may include a slider member 163a having a force bearing surface 163b. The force bearing surface 163b may be inclined with respect to a direction extending along the first sliding structure 111. In some embodiments, an angle between the force bearing surface 163b and the first sliding structure 111 may be about 45°. The pressing member 167 may protrude from the opening of the first side plate 130 for the convenience of operation.

The locking slider 163 may further include an extension member 163c extending away from the force bearing surface 163b. The extension member 163c and the slider member 163a may define a recess 163d. The recess 163d may be coupled with the adjacent second sliding structure 301 of the first battery 300. The second sliding structure 301 of the first battery 300 may include a rib 301a corresponding to the recess 163d. The rib 301a may be accommodated in the recess 163d and sandwiched between the extension member 163c and the first mounting plate 110.

The first locking part 161 may further include an in-position resisting member 164 protruding from the body 162. The in-position resisting member 164 may be located on a side of the first mounting plate 110 facing away from the first battery 300. The first mounting plate 110 may further include a contacting member 110a corresponding to the in-position resisting member 164. When the first battery 300 is attached to the first mounting plate 110, the in-position resisting member 164 may contact the contacting member 110a to lock the first battery 300.

The second elastic part 169 may be arranged in the opening 165 of the body 162. The abutting member 116 of the first mounting plate 110 may insert into the opening 165. The second elastic part 169 may include a spring coil. One end of the second elastic part 169 may be fastened to the mounting post 116a of the abutting member 116 on the first mounting plate 110. The other end of the second elastic part 169 may be fastened to the mounting post 166 of the body 162. In some embodiments, the second elastic part 169 may include a compression spring coil.

A first locking guide structure 180 may be disposed on a side of the second elastic part 169 distal from the first locking part 161. The first locking guide structure 180 may include a base 185 and a guide member 181 arranged at the base 185. The guide member 181 may guide the movement of the first locking part 161. In some embodiments, the first locking guide structure 180 may include two protruding stripes 182 on a side adjacent to the first locking part 161. The two protruding stripes 182 may be arranged parallel to each other to define the guide member 181. The body 162 of the first locking part 161 may slide in the guide member 181 defined by the two protruding stripes 182.

Further, the first locking structure 180 may include a connecting member 184 arranged at both sides of the base 185. The two connecting members 184 may be arranged opposite to each other and coupled approximately perpendicular to the base 185. At least a portion of the first locking part 161 may be accommodated in a space enclosed between the two connecting members 184 and the base 185. The two connecting members 184 may also be connected and fastened to the first mounting plate 110. In some embodiments, keyholes 183 may be arranged at the connecting members 184. The connecting members 184 may be fastened to the first mounting plate 110 by screws.

Because the attachment and interworking relationships among the first mounting plate 110, the first ejection structure 150, the first locking structure 160, the first ejection guide structure 170, the first locking guide structure 180, and the first battery 300 are the same as the attachment and interworking relationships among the second mounting plate 120, the second ejection structure 250, the second locking structure 260, the second ejection guide structure 270, the second locking guide structure 280, and the second battery 400, for the convenience of illustrations, structures of the first mounting plate 110 and the second mounting plate 120 having identical functions may use the same reference numerals, structures of the first ejection structure 150 and the second ejection structure 250 having identical functions may use the same reference numerals, structures of the first locking structure 160 and the second locking structure 260 having identical functions may use the same reference numerals, structures of the first ejection guide structure 170 and the second ejection guide structure 270 having identical functions may use the same reference numerals, and structures of the first locking guide structure 180 and the second locking guide structure 280 having identical functions may use the same reference numerals.

In some embodiments, a first sliding structure 111 may be arranged at a surface of the second mounting plate 120 adjacent to the second battery 400. In some embodiments, two first sliding structures 111 may be arranged at the surface of the second mounting plate 120 as first sliding slots. The two sliding slots may have a recessed straight bar shape and may be arranged in parallel. The two first sliding structures 111 may be arranged parallel to the two first side plates 130 and perpendicular to the second side plate 140. The two first sliding structures 111 may extend from the third side of the second mounting plate 120 to a fourth side of the second mounting plate 120 opposite to the third side. Thus, the length of the first sliding structure 111 may be the same as the length of the second mounting plate 120.

The second battery 400 may include a first surface 303 and a second sliding structure 301 arranged at the first surface 303 and coupled with the first sliding structure 111. In some embodiments, two second sliding structures 301 may be arranged in parallel and in the center position of the first surface 303. The two second sliding structures 301 may have a protruding bar shape. The two protruding bars of the second battery 400 may slide in the two first sliding slots arranged at the second mounting plate 120, such that the second battery 400 may slide into or out of the battery mounting apparatus 100. In some embodiments, the first sliding structures 111 on the second mounting plate 120 may be protruding bars and the second sliding structures 301 on the second battery 400 may be sliding slots coupled with the protruding bars on the second mounting plate 120.

In addition, when the second battery 400 is released by the first locking structure 160, the first ejection structure 150 may push out the second battery 400, such that at least a portion of the second sliding structures 301 on the second battery 400 may be separated from the first sliding structures 111 on the second mounting plate 120 and at least a portion of the second battery 400 may be slid out of the battery mounting apparatus 100.

Further, a third sliding structure 131 may be arranged at the first side plate 130. The second battery 400 may include a fourth sliding structure 302 corresponding to the third sliding structure 131. The fourth sliding structure 302 on the second battery 400 and the third sliding structure 131 on the first side plate 130 may be coupled with each other for sliding movement. When the second battery 400 is released by the second locking structure 260, the second ejection structure 250 may push out the second battery 400, such that at least a portion of the fourth sliding structure 302 on the second battery 400 may be separated from the third sliding structure 131 on the first side plate 130 and at least a portion of the second battery 400 may be slid out of the battery mounting apparatus 100.

The first side plate 130 may further include a flexible cantilever 132. The flexible cantilever 132 may be flexibly coupled to the first side plate 130.

The second battery 400 may further include a side surface 304 connected to the first surface 303. The fourth sliding structure 302 may be arranged at the side surface 304. A notch 305 be arranged at the side surface 304 and a ridge 306 may be disposed on both sides of the notch 305 on the side surface 304. The notch 305 may accommodate the flexible cantilever 132. When the second battery 400 is attached to the second mounting plate 120, the flexible cantilever 132 may be located in the notch 305. When the second battery 400 is released and pushed out from the second mounting plate 120, the flexible cantilever 132 may contact at least a portion of the ridge 306 on a side of the notch 305.

In some embodiments, the third sliding structure 131 may be a protruding bar and the fourth sliding structure 302 may be a sliding slot. The sliding slot of the fourth sliding structure 302 is in communication with the notch 305. The third sliding structure 131 may include an end portion 133 located on a side distal from the second side plate 140. The end portion 133 of the third sliding structure 131 may gradually decrease in width in a direction facing away from the second side plate 140. The sliding slot of the fourth sliding structure 302 may include a main body 302a and an end portion 302b disposed on a side of the main body 302a facing toward the second side plate 140. The end portion 302b may increase in width in a direction facing away from the main body 302a.

The second mounting plate 120 may further include an ejection structure opening 112 and a locking structure opening 118. The ejection structure opening 112 may be arranged near the first ejection structure 150 corresponding to the first sliding slot to expose at least a portion of the first ejection structure 150. The locking structure opening 118 may be arranged near the second locking structure 260 of the second mounting plate 120 to expose at least a portion of the second locking structure 260. The locking structure opening 118 may include a first portion 118a of the first slide slot and a second portion 118b in communication with the first portion 118a.

Mounting posts 114 and abutting members 116, both extending perpendicularly from the plate body, may be arranged at a surface of the second mounting plate 120 facing away from the second battery 400. The mounting posts 114 may be arranged corresponding to the second ejection structure 250. Two mounting posts 114 may be arranged at both sides of the back of the first sliding structure 111, respectively. The abutting members 116 may be arranged corresponding to the first locking structure 160. Only one abutting member 116 may be arranged. The abutting member 116 may have an approximately square shape. A mounting post 116a may be arranged at the center of the abutting member 116. The mounting post 116a may protrude perpendicularly from the surface of the abutting member 116 and may extend in a direction parallel to the plate body of the second mounting plate 120.

The second ejection structure 250 may be arranged at a side of the second mounting plate 120 facing away from the second battery 400, and may include a first ejection part 151 and a first elastic part 152. The first ejection part 151 may include a sliding slot member 158, an ejection slider 154 arranged at the sliding slot member 158, and two fastening members 159 arranged at both sides of the sliding slot member 158, respectively. A fastening post 157 may be arranged at the fastening member 159. The fastening posts 157 and the ejection slider 154 may be arranged at two opposite sides of the first ejection part 151.

The sliding slot member 158 may be arranged corresponding to the ejection structure opening 112. The sliding slot member 158 may have an n-shape cross-section and may partially accommodate the first sliding structure 111. The ejection slider 154 may be exposed from the first sliding structure 111 of the second mounting plate 120 through the ejection structure opening 112. The ejection slider 154 may have a trapezoidal cross-section, but may not be limited to the trapezoidal cross-section.

The first elastic part 152 may be arranged between the second mounting plate 120 and the first ejection part 151 to drive the first ejection part 151 to push out the second battery 400. In some embodiments, the first elastic part 152 may include two spring coils. One end of each spring coil may be fastened to the fastening post 157 of the first ejection part 151 and the other end of each spring coil may be fastened to a mounting post 114 of the second mounting plate 120. In some embodiments, the spring coils of the first elastic part 152 may include tension spring coils.

The second ejection guide structure 270 may be arranged at a side of the first ejecting elastic part 152 facing away from the first ejection part 151. The second ejection guide structure 270 may include a base 175. A guide member 171 may be arranged at the base 175 corresponding to the sliding slot member 158 of the first ejection part 151. The guide member 171 may guide the movement of the sliding slot member 158 of the first ejection part 151. In some embodiments, two protruding stripes 172 may be arranged at a side of the second ejection guide structure 270 adjacent to the first ejection part 151. The two protruding stripes 172 may be arranged parallel to each other to define the guide member 171. The sliding slot member 158 of the first ejection part 151 may slide in the guide member 171 defined by the two protruding stripes 172.

Further, the second ejection guide structure 270 may include a connecting member 174 on both sides of the base 175. The two connecting members 174 may be arranged opposite to each other and may connect approximately perpendicularly to the base 175. At least a portion of the first ejection part 151 may be accommodated in a space enclosed between the two connecting members 174 and the base 175. The connecting members 174 may be connected and fastened to the second mounting plate 120. In some embodiments, keyholes 173 may be arranged at the connecting member 174. The connecting members 174 may be fastened to the second mounting plate 120 by screws.

The second locking structure 260 may include a first locking part 161 and a second elastic part 169. At least a portion of the first locking part 161 may be exposed from the locking structure opening 118 of the second mounting plate 120 to contact the second sliding structure 301 of the second battery 400 to attach the second battery 400 to the second mounting plate 120. The second elastic part 169 may connect between the first locking part 161 and the second mounting plate 120 to drive the first locking part 161 to reset and lock the second battery 400.

In some embodiments, the first locking part 161 may include a body 162, a locking slider 163 arranged at a side of the body 162 adjacent to the second mounting plate 120, an opening 165 penetrating the body 162, a mounting post 166 arranged at the inner side of the opening 165 of the body 162 and extending toward the center of the opening 165, and a pressing member 167 arranged at a side of the body 162 distal from the locking slider 163. The locking slider 163 may be exposed through the locking structure opening 118. The locking slider 163 may include a slider member 163a having a force bearing surface 163b. The force bearing surface 163b may be inclined with respect to a direction extending along the first sliding structure 111. In some embodiments, an angle between the force bearing surface 163b and the first sliding structure 111 may be about 45°. The pressing member 167 may protrude from the opening of the first side plate 130 for the convenience of operation.

The locking slider 163 may further include an extension member 163c extending away from the force bearing surface 163b. The extension member 163c and the slider member 163a may define a recess 163d. The recess 163d may be coupled with the adjacent second sliding structure 301 of the second battery 400. The second sliding structure 301 of the second battery 400 may include a rib 301a corresponding to the recess 163d. The rib 301a may be accommodated in the recess 163d and sandwiched between the extension member 163c and the second mounting plate 120.

The first locking part 161 may further include an in-position resisting member 164 protruding from the body 162. The in-position resisting member 164 may be located on a side of the second mounting plate 120 facing away from the second battery 400. The second mounting plate 120 may further include a contacting member 110a corresponding to the in-position resisting member 164. When the second battery 400 is attached to the second mounting plate 120, the in-position resisting member 164 may contact the contacting member 110a to lock the second battery 400.

The second elastic part 169 may be arranged in the opening 165 of the body 162. The abutting member 116 of the second mounting plate 120 may insert into the opening 165. The second elastic part 169 may include a spring coil. One end of the second elastic part 169 may be fastened to the mounting post 116a of the abutting member 116 on the second mounting plate 120. The other end of the second elastic part 169 may be fastened to the mounting post 166 of the body 162. In some embodiments, the second elastic part 169 may include a compression spring coil.

A second locking guide structure 280 may be disposed on a side of the second elastic part 169 distal from the first locking part 161. The second locking guide structure 280 may include a base 185 and a guide member 181 arranged at the base 185. The guide member 181 may guide the movement of the first locking part 161. In some embodiments, the second locking guide structure 280 may include two protruding stripes 182 on a side adjacent to the first locking part 161. The two protruding stripes 182 may be arranged parallel to each other to define the guide member 181. The body 162 of the first locking part 161 may slide in the guide member 181 defined by the two protruding stripes 182.

Further, the second locking structure 280 may include a connecting member 184 arranged at both sides of the base 185. The two connecting members 184 may be arranged opposite to each other and coupled approximately perpendicularly to the base 185. At least a portion of the first locking part 161 may be accommodated in a space enclosed between the two connecting members 184 and the base 185. The two connecting members 184 may also be connected and fastened to the second mounting plate 120. In some embodiments, keyholes 183 may be arranged at the connecting members 184. The connecting members 184 may be fastened to the second mounting plate 120 by screws.

In some embodiments, the pressing member 167 of the first locking structure 160 and the pressing member 167 of the second locking structure 260 may be exposed in a same opening on the first side plate 130. The two pressing members 167 may be aligned with each other and may be operated at the same time.

Figure 5:
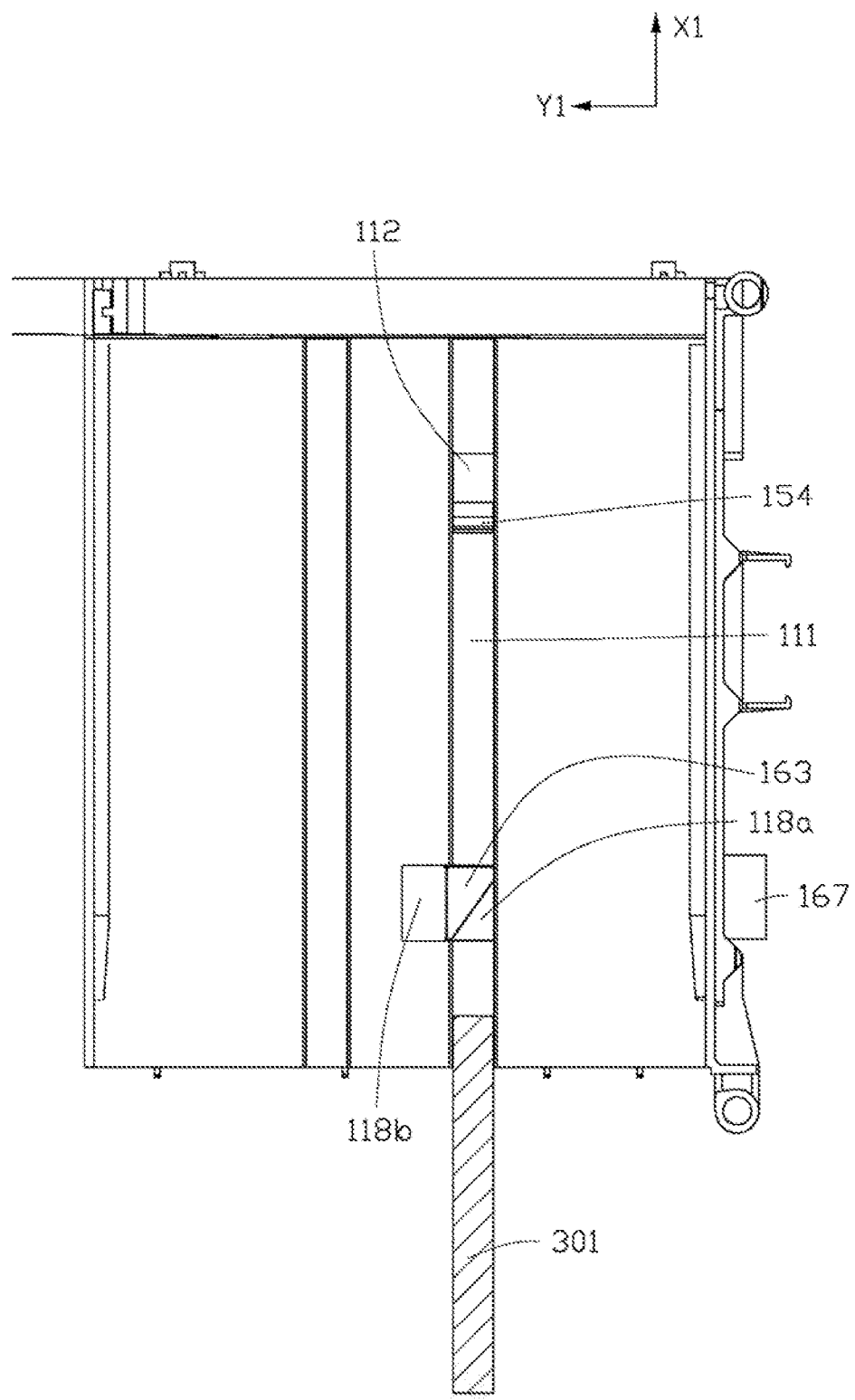
FIGS. 5-8 are schematic views of different stages of mounting and unmounting the battery using the battery mounting apparatus in FIG. 1.

FIGS. 5-8 are schematic views of different stages of mounting and unmounting the battery using the battery mounting apparatus in FIG. 1. Referring to FIGS. 5-8, for the convenience of illustrations, the first battery 300 (or the second battery 400) is shown only with the second sliding structure 301. As shown in FIG. 5, when the first battery 300 (or the second battery 400) is not mounted, i.e., in an unmounted state, the ejection slider 154 is located on a side of the ejection structure opening 112 adjacent to the locking structure opening 118, the locking slider 163 is located in the first portion 118a of the locking structure opening 118, and the flexible cantilever 132 protrudes from the surface of the first side plate 130.

Figure 6:
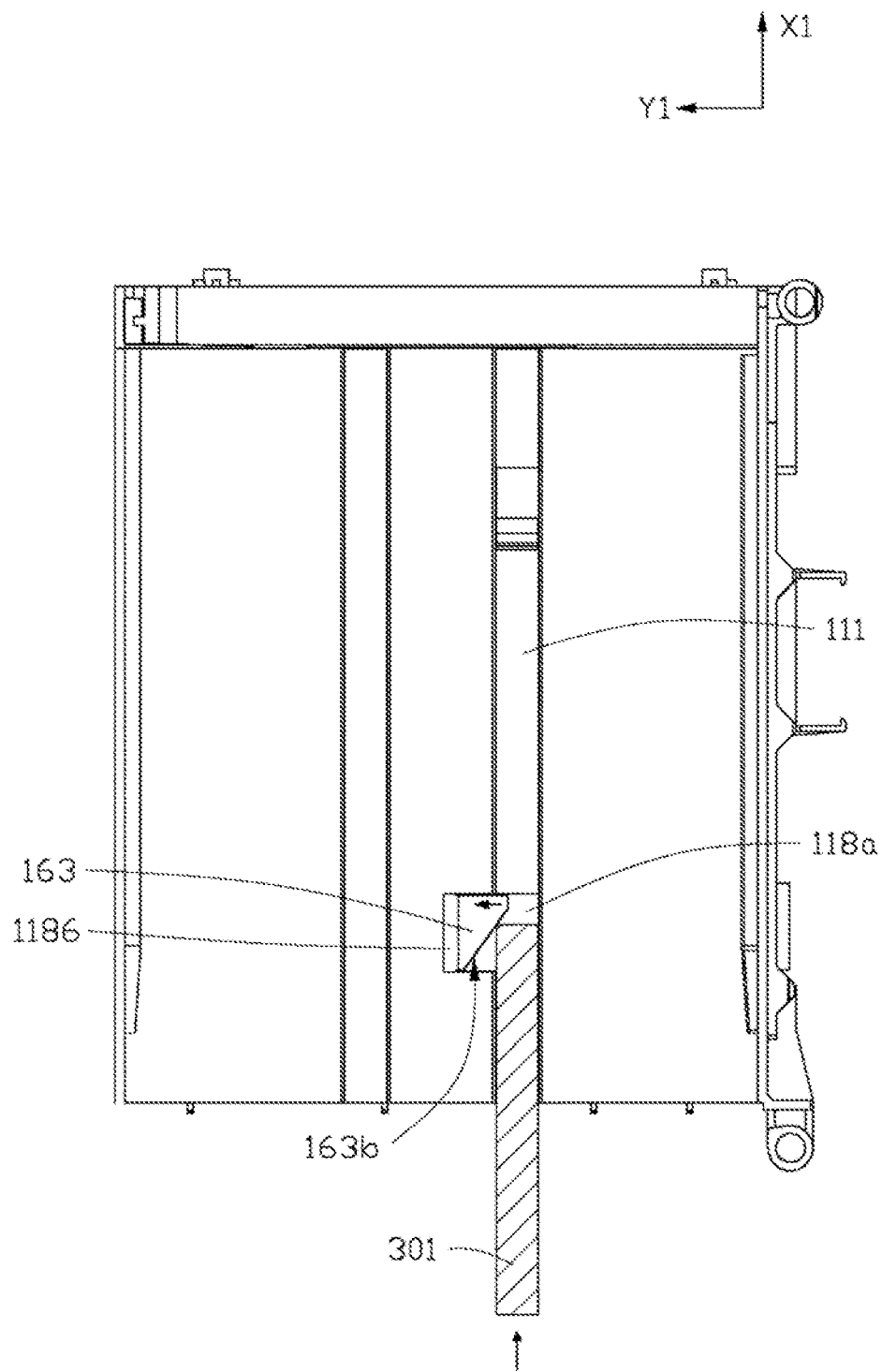
Figure 7:
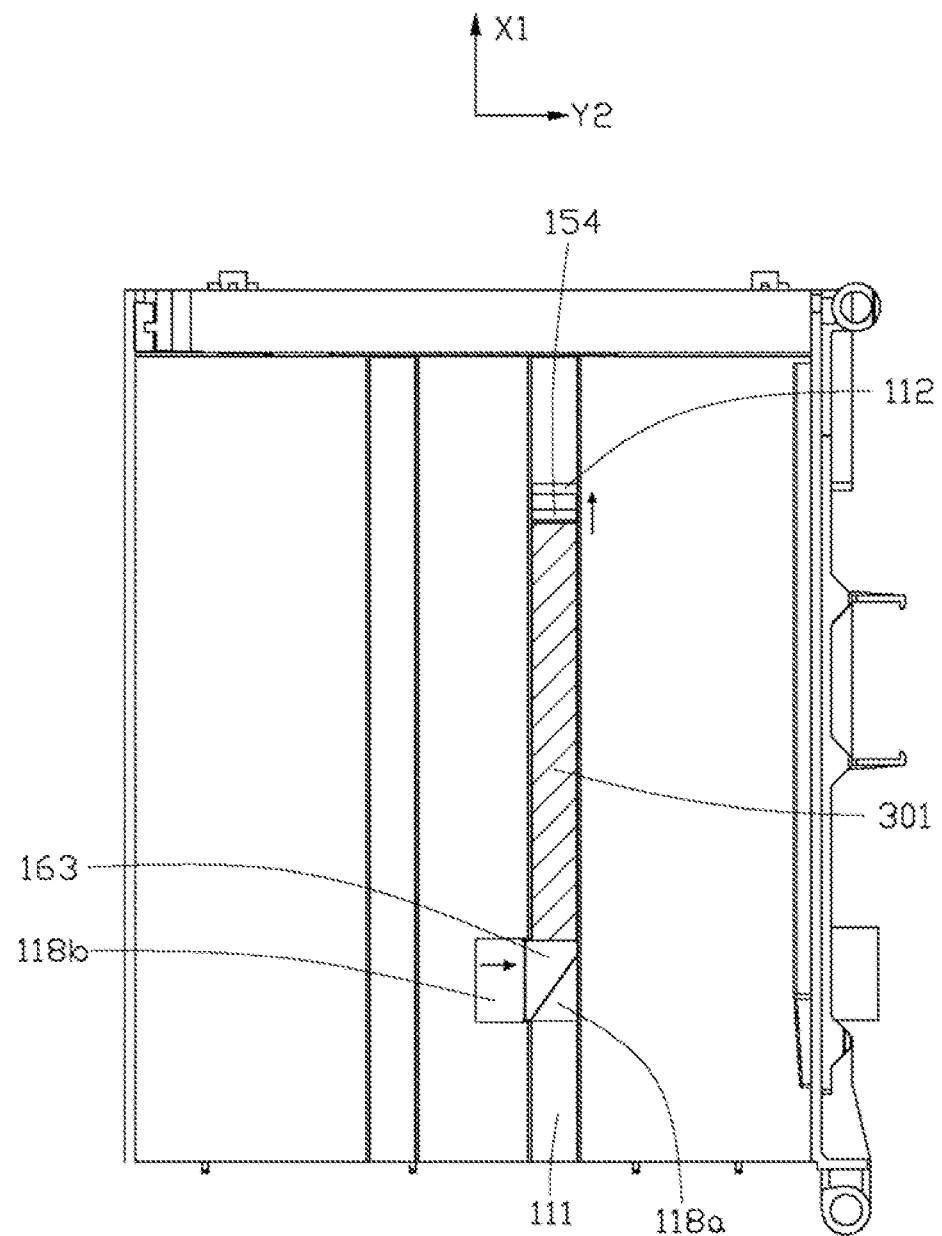

When mounting the first battery 300 (or the second battery 400), an external force may first be applied to the first battery to slide the second sliding structure 301 along a first direction X1 into the first sliding structure 111. As shown in FIG. 6, the second sliding structure 301 presses the force bearing surface 163b of the locking slider 163 to move the locking slider 163 to the second portion 118b of the locking structure opening 118 along a second direction Y1 perpendicular to the first direction X1. At this point, the second elastic part 169 may be stretched and elastically deformed. As shown in FIG. 7, the second sliding structure 301 continues to slide along the first sliding structure 111. The ridge 306 of the first battery 300 (or the second battery 400) presses down the flexible cantilever 132. The flexible cantilever 132 elastically deforms and no longer protrudes from the surface of the first side plate 130. Eventually, the flexible cantilever 132 slides into the notch 305. Then, the flexible cantilever recovers from the deformation and no longer presses the first battery (or the second battery 400).

Further, when the second sliding structure 301 slides and presses against the ejection slider 154, the ejection slider 154 moves along the first direction X1 from one side of the ejection structure opening 112 to the other, and presses against one end of the second sliding structure 301. The first elastic part 152 is stretched while the second elastic part 169 releases elastic force, thereby driving the locking slider 163 to move along a third direction Y2 from the second portion 118b of the locking structure opening 118 to the first portion 118a of the locking structure opening 118. As shown in FIG. 7, the locking slider 163 blocks the other end of the second sliding structure 301. The second sliding structure 301 is locked between the ejection slider 154 and the locking slider 163. The rib 301a of the second sliding structure 301 is accommodated in the recess 163d. The in-position resisting member 164 contacts the contacting member 110a. Thus, the first battery 300 (or the second battery 400) is mounted, i.e., in a mounted state.

Further, when unmounting the first battery 300 (or the second battery 400), the pressing member 167 of the first locking part 161 is pressed along the second direction Y1. The locking slider 163 slides from the second portion 118b of the locking structure opening 118 to the first portion 118a. The locking slider 163 releases the second sliding structure 301. The rib 301a is separated from the recess 163d. The in-position resisting member 164 is separated from the contacting member 110a. The second elastic part 169 is compressed while the first elastic part 152 releases elastic force. The ejection slider 154 of the first ejection part 151 pushes the second sliding structure 301 along a fourth direction X2, such that the second sliding structure 301 gradually slides out of the first sliding structure 111. When the ridge 306 of the first battery 300 (or the second battery 400) slides out of the notch 305 and presses the cantilever 132, the cantilever 132 deforms and presses against the first battery 300 (or second battery 400).

Figure 8:
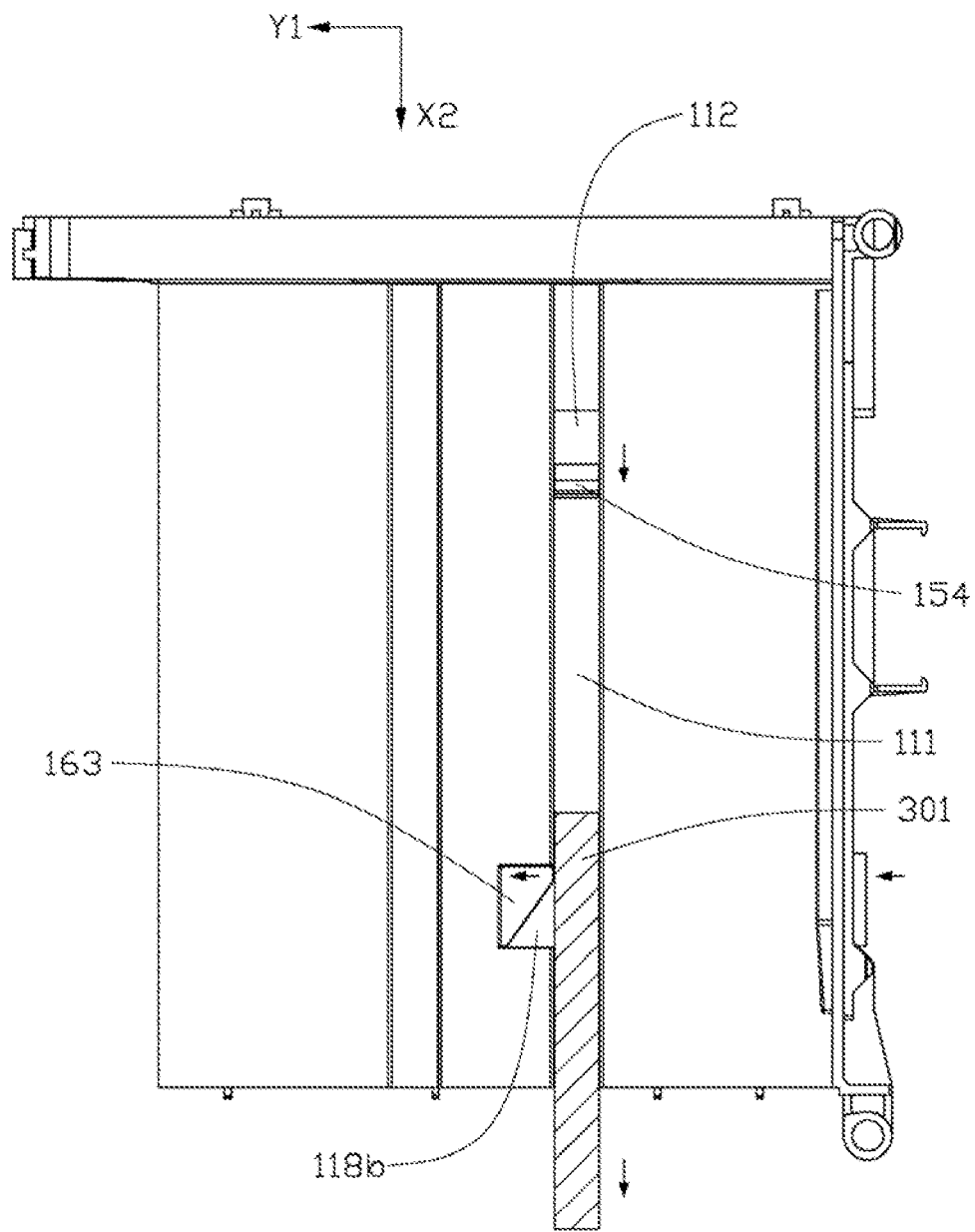

As shown in FIG. 8, the when the second sliding structure 301 slides out of the first sliding structure 111, the second elastic part 169 releases the elastic force to reset the locking slider 163 of the first locking part 161 to the first portion 118a of the locking structure opening 118, as shown in FIG. 5. Thus, the first battery 300 (or the second battery 400) is unmounted from the battery mounting apparatus 100.

Compared to the existing technology, the battery mounting apparatus 100 may include the first ejection structure 150 and the second ejection structure 250. The first ejection structure 150 may push out the first battery 300 when the first locking structure 160 releases the first battery 300, such that at least a portion of the first battery 300 is separated from the first mounting plate 110. The second ejection structure 250 may push out the second battery 400 when the second locking structure 260 releases the second battery 400, such that at least a portion of the second battery 400 is separated from the second mounting plate 120. Thus, it is relatively simple to mount and unmount the battery using the battery mounting apparatus 100.

In some embodiment, the first mounting plate 110 and the second mounting plate 120 of the battery mounting apparatus 100 may simultaneously mount two batteries to increase the battery capacity of the battery mounting apparatus 100. Because the two pressing members 167 may be operated on at the same time, the two batteries may be mounted or unmounted at the same time. Thus, it is simple to mount and unmount the battery using the battery mounting apparatus 100.

Further, when the first battery 300 or the second battery 400 is mounted or unmounted, the flexible cantilever 132 may apply a pressing force to both sides of the battery. When the battery is ejected, both sides of the battery may bear an approximately same force and move at an approximately same speed, thereby avoiding uneven ejection trajectories due to uneven forces applied to both sides of the battery. Further, when the battery is ejected, the ridge 306 may block the flexible cantilever 132 to a certain extent, thereby ensuring even ejection trajectories when the battery slides out of the battery mounting apparatus 100.

In addition, the locking slider 163 may also include the recess 163d coupled with the rib 301a of the first battery 300 or the second battery 400. Thus, the locking slider 163 may more firmly attach the first battery 300 or the second battery 400 to the battery mounting apparatus 100, and may reduce the occurrences of loosened battery due to insufficient holding force.

Figure 9:
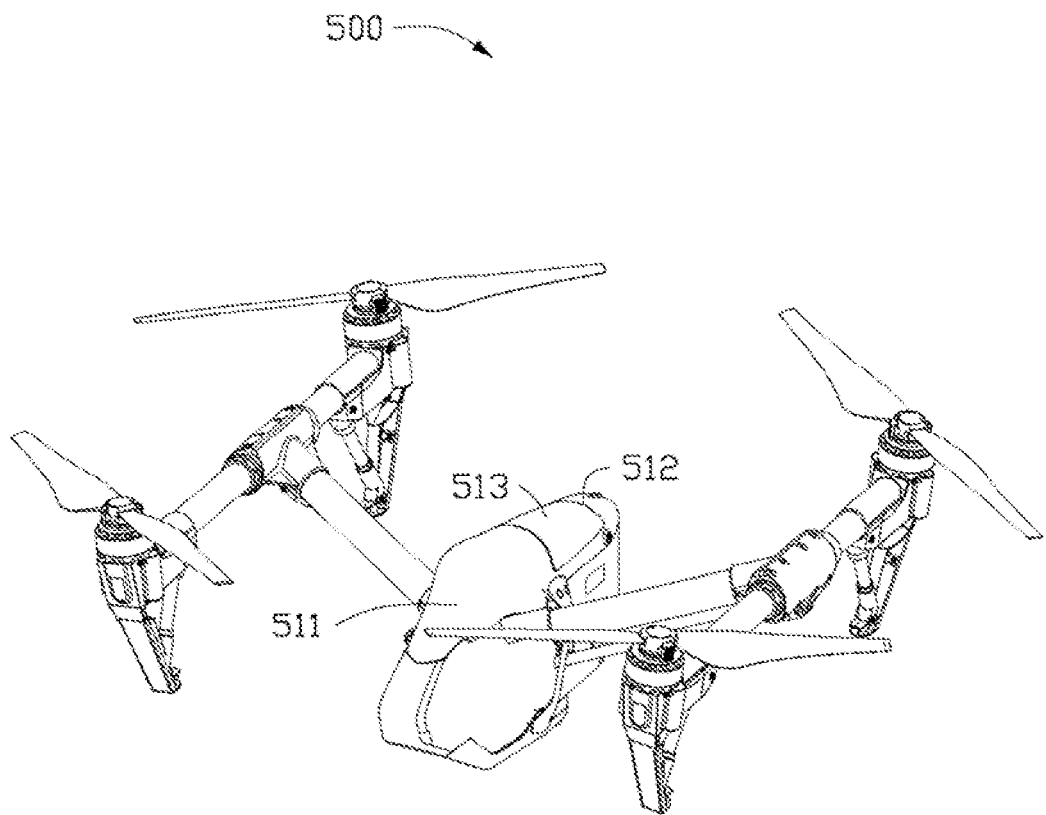
FIG. 9 is a three dimensional diagram of an unmanned aerial vehicle according to an example embodiment.

FIG. 9 is a three dimensional diagram of an unmanned aerial vehicle according to an example embodiment. As shown in FIG. 9, the unmanned aerial vehicle 500 includes a vehicle body 510. The vehicle body 510 includes a vehicle housing 511 having a battery receiving chamber 512 and a battery mounting apparatus 513 arranged inside the battery receiving chamber 512. The battery mounting apparatus 513 may be the disclosed battery mounting apparatus 100. Battery mounting and unmounting in the unmanned aerial vehicle 500 incorporating the battery mounting apparatus 100 may be relatively simple. The flight time may be relatively long. And battery loosening due to abrupt movements of the vehicle body during the flight is unlikely to occur.

Other embodiments of the disclosure will be apparent to those skilled in the art from consideration of the specification and practice of the embodiments disclosed herein. It is intended that the specification and examples be considered as example only and not to limit the scope of the disclosure, with a true scope and spirit of the invention being indicated by the following claims.

What is claimed is:
1. A battery mounting apparatus comprising:
a mounting plate configured to hold a battery;
a locking structure configured to detachably attach the battery to the mounting plate; and
an ejection structure configured to eject the battery when the locking structure releases the battery, such that at least a portion of the battery is separated from the mounting plate, the ejection structure comprising:
an ejection part comprising:
a sliding slot member; and
a fastening member adjacent to the sliding slot member; and
an elastic part made of an elastic material, one end of the elastic part being fastened to the fastening member, and another end of the elastic part being fastened to the mounting plate.
2. The apparatus of claim 1, wherein:
the mounting plate comprises a first sliding structure;
the battery comprises a second sliding structure configured to be slidably coupled with the first sliding structure; and
when the ejection structure ejects the battery, at least a portion of the second sliding structure is separated from the first sliding structure.
3. The apparatus of claim 2, wherein:
the ejection part further comprises an ejection slider;
when the battery is in a mounted state, the ejection slider contacts one end of the battery, and the elastic part is stretched; and
when the battery is released by the locking structure, the elastic part releases an elastic force to eject the ejection part, such that the ejection slider pushes at least a portion of the second sliding structure out of the first sliding structure.
4. The apparatus of claim 3, wherein:
the first sliding structure comprises a sliding slot comprising an ejection structure opening provided at a position corresponding to the ejection part;
the second sliding structure of the battery comprises a protruding stripe configured to be coupled with the sliding slot;

the ejection part is arranged at a side of the mounting plate facing away from the battery; and a portion of the ejection slider is exposed through the ejection structure opening, the portion of the ejection slider pressing against the one end of the battery when the battery is in the mounted state.

5. The apparatus of claim 4, wherein:

the sliding slot member is in communication with the sliding slot of the mounting plate to allow the protruding stripe to slide in the sliding slot member and the sliding slot; and the ejection slider is arranged in the sliding slot member.

6. The apparatus of claim 5, wherein:

the fastening member is a first fastening member;

the ejection part further comprises a second fastening member;

the elastic part comprises two spring coils disposed on two sides of the sliding slot member, respectively, and corresponding to the first fastening member and the second fastening member, respectively;

one end of each of the two spring coils is fastened to a mounting post of a corresponding one of the first fastening member and the second fastening member; and another end of each of the two spring coils is fastened to a mounting post of the mounting plate at the ejection structure opening.

7. The apparatus of claim 6, further comprising:

an ejection guide structure comprising a guide member corresponding to the ejection part and configured to guide the ejection part when the ejection part moves.

8. The apparatus of claim 7, wherein the mounting plate is a first mounting plate, the ejection structure is a first ejection structure, and the battery is a first battery;

the battery mounting apparatus further comprising:

a second mounting plate arranged parallel to the first mounting plate and having an identical structure as the first mounting plate, the second mounting plate being configured to hold a second battery; and a second ejection structure having an identical structure as the first ejection structure and located in a receiving space defined by the ejection guide structure and a plurality of separation plates of the second mounting plate, the second ejection structure being configured to, when the second battery is released, eject the second battery, such that at least a portion of the second battery is separated from the second mounting plate;

wherein the first ejection structure, the second ejection structure, and the ejection guide structure are located between the first mounting plate and the second mounting plate.

9. The apparatus of claim 4, wherein:

the elastic part is a first elastic part; and the locking structure comprises:

a locking part comprising a body and a locking slider protruding from the body; and a second elastic part, one end of the second elastic part being fastened to the mounting plate and another end of the second elastic part being fastened to the body, the second elastic part being configured to:

during a process of the locking part locking the battery to the mounting plate, undergo a first deformation;

when the battery is locked to a pre-determined position on the mounting plate, undergo a second deformation opposite to the first deformation to press the locking part, such that the locking slider locks the battery; and when the locking part releases the battery, undergo the first deformation to allow the locking slider to release the first battery.

10. The apparatus of claim 9, wherein:

the mounting plate further comprises a locking structure opening adjacent to the locking part and comprising a first portion at the sliding slot and a second portion at a plate body of the mounting plate, the second portion being in communication with the first portion;

when the locking slider is located at the first portion, the locking part locks the battery to the mounting plate; and when the locking slider is pushed, the locking slider moves from the first portion to the second portion to release the battery.

11. The apparatus of claim 10, wherein:

the locking slider comprises a force bearing surface arranged perpendicular to the mounting plate and inclined with respect to the sliding slot, and when the protruding stripe of the battery slides into the sliding slot, the battery presses against the force bearing surface to move the locking slider from the first portion to the second portion; and/or the locking slider comprises a recess adjacent to the second sliding structure of the battery, and the second sliding structure of the first battery comprises a rib corresponding to and accommodated in the recess.

12. The apparatus of claim 9, wherein:

the locking part also comprises an in-position resisting member extending from the body and arranged at a side of the mounting plate facing away from the battery;

the mounting plate further comprises a contacting member corresponding to the in-position resisting member; and when the battery is mounted to the mounting plate, the in-position resisting member presses against the contacting member to lock the battery.

13. The apparatus of claim 12, wherein:

the mounting plate further comprises an abutting member extending approximately vertically from the plate body, the body of the locking part comprises an opening at a center of the body and penetrating the body, the abutting member extends into the opening of the body, the second elastic part is located in the opening of the body, and two ends of the second elastic part press against the abutting member and the body, respectively; and/or the second elastic part comprises a spring coil, one end of the spring coil being fastened to a mounting post of the abutting member, and another end of the spring coil being fastened to a mounting post of the body; and/or the locking part further comprises a pressing member, and when the pressing member is operated, the body is pushed to move the locking slider to release the battery.

14. The apparatus of claim 12, further comprising:

a locking guide structure comprising a guide member, the guide member corresponding to the locking part and being configured to guide movement of the locking part.

15. The apparatus of claim 14, wherein the mounting plate is a first mounting plate, the locking structure is a first locking structure, and the battery is a first battery;

the battery mounting apparatus further comprising:

a second mounting plate arranged parallel to the first mounting plate and having an identical structure as the first mounting plate, the second mounting plate being configured to hold a second battery; and a second locking structure having an identical structure as the first locking structure and located between the locking guide structure and the second mounting plate, the second locking structure being configured to detachably attach the second battery to the second mounting plate;

wherein the first locking structure, the second locking structure, and the locking guide structure are located between the first mounting plate and the second mounting plate.

16. The apparatus of claim 1, further comprising:

two first side plates arranged at opposite sides of the mounting plate; and a second side plate connected between the two first side plates;

wherein the two first side plates, the second side plate, and the mounting plate enclose a space for receiving the battery.

17. The apparatus of claim 16, wherein:

one of the first side plates comprises a first sliding structure;

the battery comprises a second sliding structure corresponding to the second sliding structure; and when the locking structure releases the battery, the ejection structure ejects the battery, such that at least a portion of the second sliding structure of the battery is separated from the first sliding structure of each of the first side plates.

18. The apparatus of claim 17, wherein:

the first sliding structure comprises a protruding stripe; and the second sliding structure comprises a sliding slot.

19. The apparatus of claim 18, wherein:

the first sliding structure comprises an end portion located distal from the second side plate; and a width of the end portion of the first sliding structure decreases along a direction facing away from the second side plate.

20. The apparatus of claim 19, wherein:

the one of the first side plates further comprises a flexible cantilever;

the battery comprises a notch corresponding to the flexible cantilever;

when the battery is mounted on the mounting plate, the flexible cantilever is accommodated in the notch; and when the battery is sliding on the mounting plate or at least partially separated from the mounting plate, the flexible cantilever presses against at least a portion of a side of the battery having the notch.

* * * * *